(12) United States Patent
Piazza

(10) Patent No.: US 8,494,370 B2
(45) Date of Patent: Jul. 23, 2013

(54) LOCATING COMPONENTS IN DATA CENTER

(75) Inventor: William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/857,123

(22) Filed: Aug. 16, 2010

(65) Prior Publication Data

US 2012/0039612 A1 Feb. 16, 2012

(51) Int. Cl.
*H04B 10/00* (2006.01)
(52) U.S. Cl.
USPC ........... 398/118; 398/127; 398/115; 398/116; 398/66; 455/151.2; 455/151.4; 455/153.2
(58) Field of Classification Search
USPC ............. 398/41–73, 118, 127, 130, 115, 116, 398/117; 455/39, 73, 151.2, 456.1, 500
See application file for complete search history.

(56) References Cited

U.S. PATENT DOCUMENTS

| | | | |
|---|---|---|---|
| 6,826,368 B1 * | 11/2004 | Koren et al. | 398/50 |
| 6,881,142 B1 | 4/2005 | Nair | |
| 7,272,945 B2 | 9/2007 | Bash et al. | |
| 7,667,855 B2 | 2/2010 | Piazza | |
| 2006/0171538 A1 | 8/2006 | Larson et al. | |
| 2007/0069021 A1 | 3/2007 | Elrod et al. | |
| 2009/0019201 A1 | 1/2009 | Chainer et al. | |
| 2010/0010678 A1 | 1/2010 | Dawson et al. | |

FOREIGN PATENT DOCUMENTS

EP    1875139 B1    12/2009

OTHER PUBLICATIONS

Liu, Jie, et al. "Project Genome: Wireless Sensor Network for Data Center Cooling", The Architecture Journal Input for Better Outcomes, 2010 Microsoft Corporation, 12 pages.

* cited by examiner

*Primary Examiner* — M. R. Sedighian
(74) *Attorney, Agent, or Firm* — Cynthia G. Seal; Jeffrey L. Streets

(57) ABSTRACT

Embodiments of the invention include systems and method for determining the location of components in a data center. In one embodiment, a component locating system includes a lattice formed of interconnected hubs and rods. Each hub in the lattice computes its address relative to the address of a reference location, such as the location of an adjacent hub or of an origin hub defining the origin of a reference coordinate system. A plurality of optical transmitters is distributed along the lattice to transmit location information. Optical receivers mounted on top of the racks receive the location information and communicate the location information to rack-mounted components. The racks and rack-mounted components determine their locations from the location information and optionally transmit the location information to a central management server.

19 Claims, 4 Drawing Sheets

LOCATING COMPONENTS IN DATA CENTER

BACKGROUND

1. Field of the Invention

The present invention relates generally to managing data center equipment, and more particularly to automatically determining the location of components in a data center.

2. Background of the Related Art

A data center is a facility housing large, powerful computer systems and related infrastructure for centralized operation and management of the computer systems. Servers and other computer equipment in a data center are typically mounted in racks in a compact, high-density configuration to make efficient use of the available space in the data center. A data center may house numerous racks, with each rack capable of holding a large quantity of rack-mounted equipment. Supporting equipment in the data center generally includes redundant or backup power supplies, redundant data communications connections, environmental controls, and security devices.

A data center may contain hundreds or even thousands of servers. From time to time, servers may be installed, removed, or relocated in a data center, such as for maintenance, replacement, or upgrades. The maintenance or replacement of a server is often time-sensitive because that server may perform important business functions. Therefore, knowing the location of the various servers and other components is important, but also challenging due to the large number of servers and racks in a typical data center. A number of systems and methods have therefore been proposed in the art for locating racks and rack-mounted components in a data center.

BRIEF SUMMARY

One embodiment of the present invention provides a system for locating a component in a data center. The system includes a plurality of hubs and a plurality of rods. Each rod has opposing ends and a bus extending between the opposing end. Each hub has a plurality of ports. Each port is for coupling to an end of one of the rods in communication with the bus to form a customizable lattice of interlocking rods and hubs. Each hub in the lattice is in communication with one or more other hubs in the lattice over the bus. A hub controller on each hub is configured for computing its address according to the address of another hub in the lattice. A plurality of wireless transmitters distributed along the lattice is in electronic communication with one or more of the hub controllers. Each wireless transmitter is configured for wirelessly transmitting location information determined relative to the addresses of the hubs.

Another embodiment of the invention provides a method wherein a plurality of hubs and rods are interconnected to form a lattice by coupling a first end of each rod with a port of one hub and coupling an opposing second end of each rod with the port of another hub. One of the hubs is uniquely designated as the origin hub. Each port of the origin hub is also uniquely identified. A separate message is generated at each port of the origin hub indicating the address of the origin hub and the identity of the port at which the message is generated. The message at each port of the origin hub is communicated to the port of an adjacent hub over a respective rod connecting the port of the origin hub to the port of the adjacent hub. The address of each adjacent hub is determined according from the message communicated from the origin hub. Location information is wirelessly transmitted from a plurality of different locations within the lattice through open space. The location information is determined relative to the address of one or more of the hubs.

DETAILED DESCRIPTION

The present invention includes systems and methods for providing positional awareness to computer racks and rack-mounted components in a computer room, such as in a data center. One embodiment provides a customizable system comprising a plurality of interconnecting hubs and rods that may be assembled to form a lattice. The lattice may be secured from the ceiling of a data center above the components to be located. One of the hubs may be designated as the origin of a reference coordinate system, and other hubs in the lattice automatically determine their location relative to the reference coordinate system. A plurality of optical transmitters is supported on the lattice, such as by being built-in to the hubs and/or rods. Temperature sensors in communication with the optical transmitters may also be supported on the lattice for determining the temperature at various locations in the reference coordinate system. The optical transmitters optically transmit location information and optionally temperature information from a plurality of different locations in the reference coordinate system. Optical receivers mounted on components below the lattice receive the transmitted location and temperature information for determining the positions of the racks and rack-mounted components. This positional awareness of the racks and rack-mounted components is useful in several practical applications, such as for inventorying the data center equipment, facilitating prompt repair actions, and identifying available bays for receiving additional components. This positional awareness is also useful in implementing advanced management schemes that assign or redistribute workload among the various rack-mounted components, such as to balance energy consumption and heat generation in relation to the workload on the components.

Figure 1:
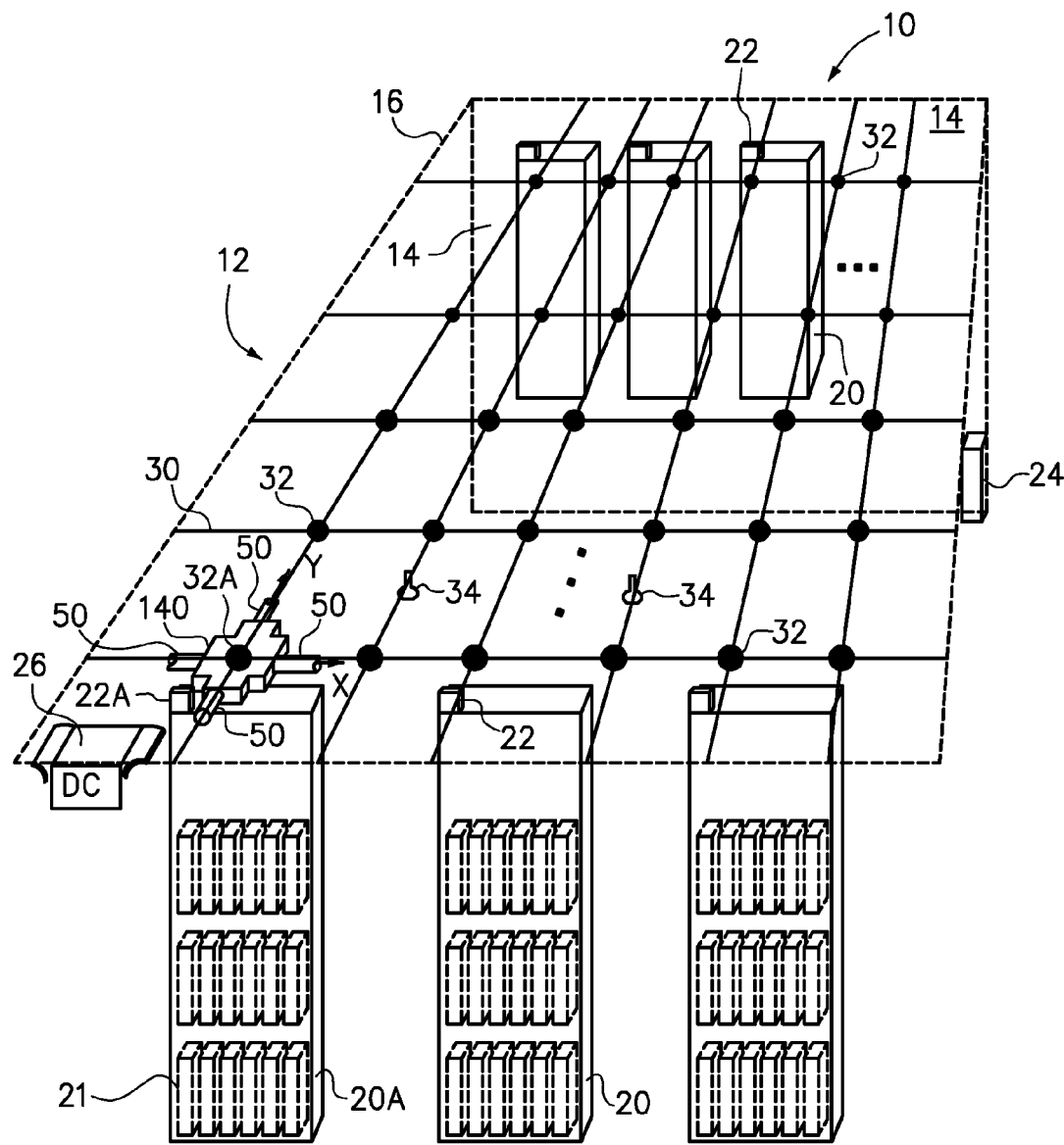
FIG. 1 is a schematic perspective view of a component locating system installed in a computer room according to an embodiment of the invention.

FIG. 1 is a schematic perspective view of a component locating system 10 installed in a computer room 12 according to an embodiment of the invention. A rear wall 14 and ceiling 16 of the computer room 12 are shown for reference, with other walls and room features omitted for clarity. The computer room 12 may be the room of a data center, with racks 20 positioned at various locations within the computer room 12. Each rack 20 receives a plurality of rack-mounted components 21. The rack-mounted components 21 may include, for example, blade servers and support modules for providing shared resources such as power, cooling, and network connectivity to the rack-mounted servers. The component locating system 10 includes a lattice 30 secured to the ceiling 16 above the racks 20 and numerous wireless transmitters 32 for transmitting location information to the racks 20. Each rack 20 has a wireless receiver 22 for receiving the wirelessly transmitted location information and using the location information to determine the location of the associated rack 20. The receiver 22 on each rack 20 is in communication with the components 21 on that rack 20 for communicating location information to its components 21, such as via a USB port, Ethernet connection, or additional optical links within the rack 20. The components 21 may determine their location from the received location information.

The lattice 30 comprises interconnected hubs 40 and rods 50, as further detailed below with respect to FIG. 2. For ease of illustration, only one hub (which may be referred to as the "origin hub" or the "master hub" 140) and four rods 50 interconnected with the master hub 140 are shown in FIG. 1. The other rods in the lattice 30 are represented in FIG. 1 by gridlines, wherein a "reference hub" or "slave hub" may be located at each intersection of the gridlines. The lattice 30 provides a framework from which the plurality of spaced-apart transmitters 32 is supported. The lattice 30 is powered at one or more points by a bulk DC voltage supply 26 provided at one or more locations in the computer room 12. Appropriate over-current protection (such as fuses or self-resetting circuit breakers) may be incorporated to meet United Laboratories (UL) and other regulatory/safety agency requirements. The lattice 30 may be secured to the ceiling, for example, by using clips that attach the lattice 30 to an existing drop ceiling or other overhead structural elements.

The transmitters 32 and receivers 22 communicate wirelessly with one another through an open air space between the lattice and the racks. Thus, no physical connection exits between the transmitters 32 and receivers 22. The transmitters 32 and receivers 22 may communicate in an electromagnetic frequency range, two examples of which include an infrared frequency range and a radio frequency range. In one embodiment, the transmitters 32 and receivers 22 are optical transmitters and receivers that communicate using electromagnetic waves in the infrared frequency range. While another embodiment may use a radio-frequency range for communicating between transmitters and receivers, infrared optical communication is particularly well suited in communicating positional information because infrared transmitters 32 may provide a directional transmission path that is not visible to the human eye. One example of an infrared generator suitable for this embodiment is a light-emitting diode (LED). Each infrared transmitter 32 may be an LED or include an LED controllable for optically communicating a signal representative of location information to the receivers 22. The signal may be communicated, for example by switching illumination of the LED on and off or at varying degrees of intensity in a pattern representative of the message to be optically conveyed. Positioning the receivers 22 on the tops of the racks 20 in this embodiment provides an unobstructed line-of-sight between each receiver 22 and one or more transmitters.

A directional transmission path of each transmitter 32 may be directed downwardly, such as in a vertical direction. The directional transmission path may provide a limited detectable range, such as the width of an infrared beam of an LED as the optical transmitter. Using a limited-width transmission path prevents receivers 22 on other racks 20 located outside of this range from inadvertently receiving and potentially misinterpreting location information. While an optical link is described by way of example, other suitable wireless connections known in the art may alternatively be used for wireless communication between lattice-mounted wireless transmitters and rack-mounted wireless receivers. Such alternative wireless transmitters would also preferably have the ability to provide a directional, limited-width transmission path. The ability to communicate location information wirelessly between the transmitters 32 on the lattice 30 and receivers 22 on the racks allows the racks 20 and rack-mounted components 21 to determine their locations wherever the racks 20 happen to be located in the computer room 12.

The position of a selected feature of the lattice 30 may be expressed with respect to the planar reference coordinate system (X,Y). An element of the lattice 30 or an element in communication with the lattice 30 may be used to define the origin (0,0) of the reference coordinate system. In this embodiment, the origin (0,0) of the reference coordinate system is defined by the master hub 140. The position of each hub relative to the lattice 30 may be described by an address of the hub. The address may be expressed as coordinates (X,Y). The address of the master hub 140 is then (0,0), and the address of all other hubs relative to the master hub 140 may be expressed as rectangular coordinates. Each transmitter 32 encodes and transmits location information downwardly toward the racks 20. The transmitted location information is dependent on the position of the transmitter 32 in the lattice 30, which may be determined relative to the address of a hub 40. In the embodiment of FIG. 1, each transmitter 32 is conveniently centered on one of the hubs 40. Thus, a transmitter 32 positioned on a hub 40 may transmit the address of that hub 40. In another embodiment, one or more transmitters may be provided at known positions along each rod 50 spaced from the hubs, such as at the center of each rod 50. A transmitter provided at a known position along a rod may still determine its position in the reference coordinate system relative to the address of one of the hubs 40 to which that rod is connected.

The receivers 22 determine the locations of the respective racks 20 based on the location information encoded in the communicated electromagnetic signals. For example, in FIG. 1, a specific one of the receivers identified at 22A receives signals transmitted from the nearest one of the transmitters 32A (there is no pre-established association between the receiver 22A and transmitter 32A). The receiver 22A may also detect and interpret location information from more than one transmitter 32 by comparing the locations information received from the different transmitters 32. For example, receiver 22A may interpolate the position of the rack 20A based on location information from more than one transmitter 32, wherein the receiver 22A associated with the rack 20A is not directly below (i.e. at the same XY position as) any one of the transmitters 32. The transmitters 32 may further communicate information regarding the signal strength of each transmitter 32 providing location information to the receiver 22A, so that the receivers 22A may use the signal strength as an indication of relative proximity to the transmitters 32.

Each component 21 may determine its location according to the location of the rack 20 in which the component 21 is mounted. Thus, in one implementation, each component 21 may determine and report its position as the position of the rack 20 in which it is mounted. The component 21 may report additional information used to distinguish it from other components 21, such as a component identifier (e.g. serial number or name) uniquely identifying the component 21, or a bay identifier identifying which one of a plurality of bays in which the particular component 21 is mounted. In another implementation, each component 21 may further compute its relative position in the rack 20 in which it is mounted, to more particularly specify the location of that component 21 in the computer room 12.

A central management server 24 is optionally provided in communication with the racks 20 and components thereof to track the positions of the racks 20 and rack-mounted components, as determined based on the location information transmitted from the lattice 30. The central management server 24 may comprise computer hardware containing computer usable program code embodied on a computer readable storage medium, and one or more processors for executing the computer usable program code. The computer usable program code includes computer executable instructions for inventorying the data center equipment, facilitating prompt repair actions, and identifying available bays in the racks 20 for receiving additional components. The positional awareness of the racks 20 and rack-mounted components is therefore useful in implementing advanced management schemes. For example, the central management server, according to a particular software-based management suite residing on the management server 24, may selectively assign or redistribute workload among the various rack-mounted components, such as to balance energy consumption and heat generation in relation to the workload on the components. In this embodiment, the central management server 24 is illustrated as a single hardware unit separated from the racks 20. The central management server 24 may alternatively be implemented as software installed on an administrative computer (not shown) that remotely manages the computer room 12. The central management server 24 may also include one or more components residing on one or more of the servers or other rack-mounted components in the racks 20.

In any of its implementations, the central management server 24 may receive location information from one or more of the rack-mounted receivers 22 through a direct data communication connection with the rack-mounted receiver or with rack-mounted components on the respective rack 20. Such data communication may be provided over, for example, a data communications bus, a data communications network, or combinations thereof used for networking the rack-mounted components 21. The central management server 24 may alternatively be in communication with the receivers 22 or rack-mounted components 21 over a wired network (e.g. a Local Area Network or "LAN") or wireless network (e.g. a Wireless LAN).

Temperature sensors 34 are optionally provided on the lattice 30 for sensing temperatures at different locations throughout the computer room 12. The temperature sensors 34 may be provided at predetermined positions on each rod 50 or hub 40, so that the sensed temperatures may be directly associated with the locations of the sensed temperatures, such as with respect to the reference coordinate system. The temperature sensors 34 are supported on the lattice 30 a distance above the racks 20. The temperature sensors 34 may sense temperatures at the locations of the temperature sensors 34. Alternatively, the temperature sensors 34 may include a directional temperature sensor, such as an infrared (IR) temperature sensor, for remotely sensing surface temperatures of the racks 20, i.e. at a distance away from the temperature sensors 34. Directional temperature sensors may be directed vertically downwardly, for example, to detect the temperature of racks 20 below.

In one implementation, the temperature sensors 34 are connected to the transmitters 32 so that the transmitters 32 may wirelessly transmit the sensed temperatures to the receivers 22 along with the location information. The receivers 22 may then communicate the sensed temperatures and location information to the management server 24. Alternatively, the lattice 30 may be connected to a computer room network, and the sensed temperatures may be communicated over the computer room network to the central management server 24. Thus, the central management server 24 may track the locations and temperatures of racks and rack-mounted components. For example, the central management server 24 may generate an alert if the temperature of any of the racks 20 reaches a predefined threshold, such as a maximum allowable temperature. Such an alert could include the temperatures and the location(s) of the affected rack(s) 20.

Figure 2:
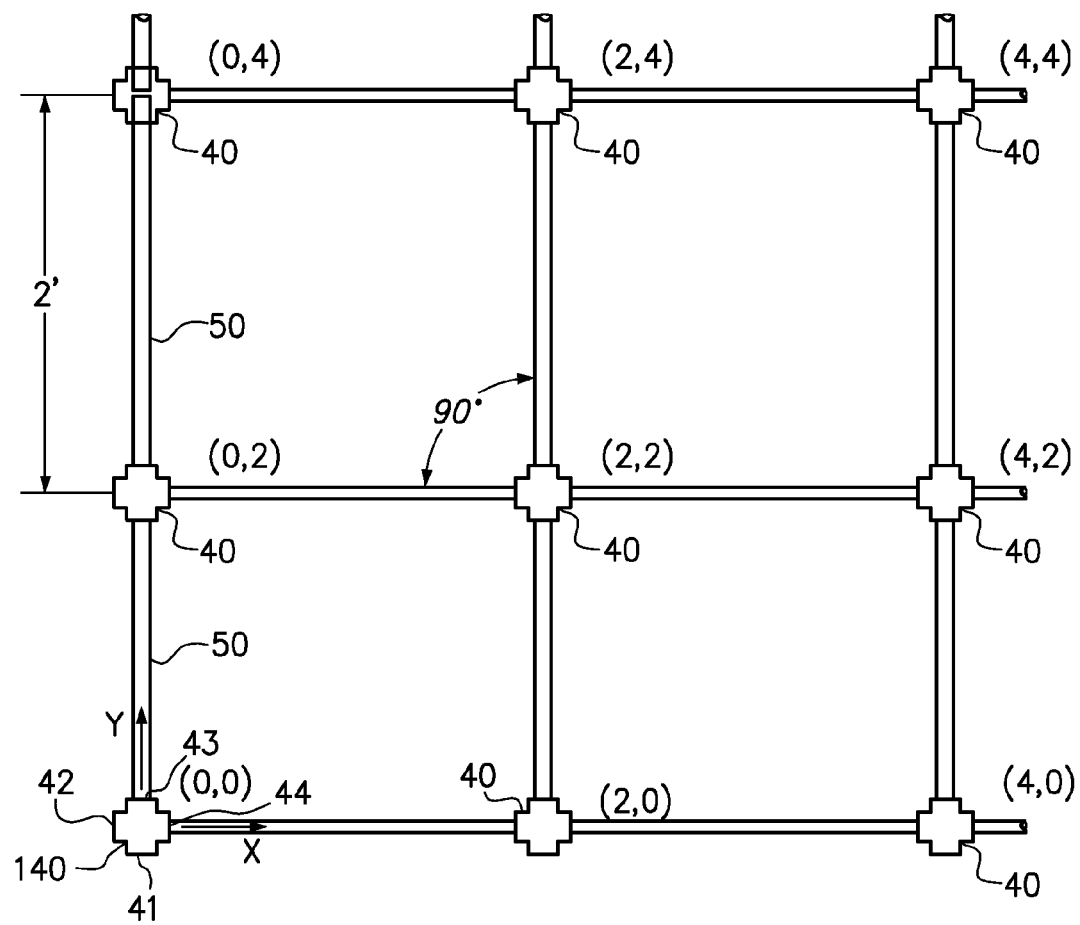
FIG. 2 is a plan view of a representative section of the lattice of FIG. 1, detailing how the interlocking structure of the hubs and rods may be used to determine the addresses of the hubs.

FIG. 2 is a plan view of a representative section of the lattice 30 detailing how the interlocking structure of the hubs 40 and rods 50 may be used to determine the addresses of the hubs 40. Generally, in any given embodiment, each hub may include a plurality of ports for receiving a rod. A lattice may be constructed by interconnecting the rods and hubs. Each port has a fixed orientation with respect to the hub, so that each rod connected to a hub has a predefined orientation with respect to the other rods connected to that hub. Each rod may have a predefined length. The relative position of each hub in the lattice (expressed as an address of the hub) may be determined according to the address of an adjacent hub in the lattice and the orientation and length of the rod connecting the adjacent hubs. By way of example, each hub 40 in the FIG. 2 embodiment has four ports 41, 42, 43, 44, angularly spaced at ninety degrees. The hubs 40 are interconnected at a two-foot spacing using rods 50. Each of the four ports 41-44 accepts an end of one of the rods 50, with adjacent rods 50 oriented at right angles with respect to one another. The resulting lattice 30 includes a rectangular array of hubs 40. It should be recognized that some hubs will use less than four ports, and specialty hubs may be prepared with only two ports (for limited use in corners) or only three ports (for limited use along a wall).

The dimensions of the hubs 40 and the rods 50 are predefined to give the desired spacing between hubs 40. In the embodiment of FIG. 2, for example, the length of each rod 50 is selected so that the resulting spacing between any two adjacent hubs spaced apart in the X or Y direction will be two feet center-to-center. To achieve the two-foot spacing between hubs 40, each rod 50 may actually be less than two feet in length to account for the depth to which each the ports allow each rod 50 to be inserted into the hub 40.

All of the rods 50 optionally have the same length, so that any two adjacent hubs have the same spacing. In another embodiment, rods of different rod lengths may be used to construct the lattice 30. The length of each rod 50 may be readable by a hub 40 to which the rod 50 is connected. For example, rods of different lengths may be keyed according to length. A key may either be a physical key identifiable by its physical characteristics of an electronic key, such as an electronically readable key encoded on each rod 50. A microchip or microcontroller, which may be included with a hub controller 45 (see FIG. 3) on each hub, may determine the rod length at each port by reading the key on the rod connected at that port. Alternatively, jumper signals or other mechanisms built into the rods may be used to identify their lengths to the hubs that they are attached to. Then, the spacing between adjacent hubs may be determined according to the key, jumper, or other indication of rod length, as read by the hub controller 45.

The hubs 40 and rods 50 may be provided as a kit for the on-site assembly of a component locating system. The kit may include any quantity of hubs 40 and rods 50 that may be assembled, such as by data center personnel, to form a lattice 30 that fits the particular dimensions of the data center or other site. The dimensions of the lattice 30 are determined by how many hubs 40 and interconnecting rods 50 extend in either the X or Y directions. The length and width of the lattice 30 may be selected to accommodate computer rooms with different dimensions. The lattice 30 may thereby be formed to accommodate any of a variety of computer rooms of different dimensions. Furthermore, the lattice 30 need not be a continuous rectangular lattice. Rather, openings may be left in the lattice 30 by omitting hubs and rods in sections, such as to avoid obstructions in the data center or to accommodate non-rectangular portions of a room. For example, the lattice 30 may be constructed to avoid vertical support columns that may extend to the ceiling of a data center, or to turn a corner in an L-shaped room.

The address of a master hub 140 defines the origin (0,0) of the reference coordinate system. The master hub 140 is at the bottom, left corner of the portion of the lattice 30 shown in FIG. 3. However, the master hub 140 may be the position of any hub in the lattice so designated, and not necessarily at a corner of the lattice 30, since the master hub 140 may serve as a reference point for determining the addresses of other hubs 40 no matter where in the lattice 30 the master hub 140 is located. The master hub 140 may be preprogrammed as being the master hub 140. Alternatively, each hub 40 may be substantially identical, and include a jumper, switch, or other device for selecting whether that hub 40 is to be a master hub, with respect to which the addresses of all other hubs 40 in the lattice 30 may be determined.

The address of each hub 40 in the lattice 30 is labeled in FIG. 2 with coordinates (X,Y), where the coordinates have units of feet in this example. The address of each hub 40 indicates its position relative to the master hub 140. Directional information may be designated according to the X,Y references axes. The "+X" and "−X" directions are oriented in the positive and negative X directions, respectively. Likewise, the "+Y" and "−Y" directions are oriented in the positive and negative Y directions, respectively. For example, the hub with address (2,0) is spaced two feet from the master hub 140 in the "+X" direction, while the hub at address (0,4) is spaced four feet from the master hub 140 in the "+Y" direction.

Each hub 40 receives a message sent from an adjacent hub to one of its ports 41-44. In each instance where one hub sends a message to another hub, the hub sending the message may be referred to as the "source hub" and the particular hub receiving the message may be referred to as the "destination hub." The message contains the address of the source hub. The message may also contain the direction the message was sent to the destination hub, or the destination hub may determine the direction from which the message was received. The destination hub computes its own address based on the address of the source hub, the direction the message was sent along the lattice 30, and the length of the rod across which the message was conveyed. After the destination hub has computed its own address, it then generates its own message (taking on the role of a source hub in that instance) containing its computed address for communication to another adjacent hub 40 (now the destination hub in that instance).

The master hub 140 provides the initial reference point by which the addresses of all other hubs 40 in the lattice 30 are subsequently determined. Initially, the master hub 140 may communicate a message to the adjacent hubs at (0,2) and (2,0) containing the address (0,0) of the master hub and the direction each message is sent. The adjacent hub at (2,0) is coupled by a rod 50 to the "+X" port 44. Thus, the master hub 140 transmits a message to the port 44 containing its address (0,0) and the direction "+X" the message is being sent. The master hub 140 separately transmits a message to the port 43 containing its address (0,0) and the direction "+Y" that message is being sent. From these messages, the adjacent hubs at (0,2) and (2,0) compute their own addresses, and then generate their own messages for communication to other hubs 40 in the lattice. For example, the hub 40 at (2,0) communicates its address to one or both of the adjacent hubs at (4,0) and (2,2) to determine their addresses, and so forth. It should be recognized that a destination hub can use the message to also determine the coordinate system to use in any subsequent message that it transmits.

Sometimes a hub may receive a message from more than one other hub in the lattice 30, where either message will be sufficient for the destination hub to determine its own address. This redundancy of a hub receiving more than one message may be handled in a variety of ways. A hub may reject or ignore any subsequent messages received after the hub has determined its address. Alternatively, the hub may recompute its address based on the subsequent message, as a confirmation that the correct address has been determined. Additionally, because the hubs 40 and rods 50 are releasably connected, the lattice 30 may be occasionally restructured, such as by data center personnel disassembling and reassembling the lattice 30, or modifying the lattice 30 to accommodate new obstacles in the data center such as newly added components. Thus, a hub 40 may be configured to compute and recomputed its address with each new message received, so that the position of the hub 40 is dynamically updated as the lattice 30 is restructured.

In this example, each hub 40 determines its address based on the address of an immediately adjacent hub 40. Alternatively, a hub 40 may determine its address based on the address of a hub spaced two or more hubs away from the hub 40. For example, the hub at (2,0) may communicate to the hub at (4,0) that it is two rod-lengths or cells away from the master hub 140 in the +X direction, and the hub at (4,0) may determine its address from that information without explicitly knowing the address of the immediately adjacent hub 40.

Figure 3:
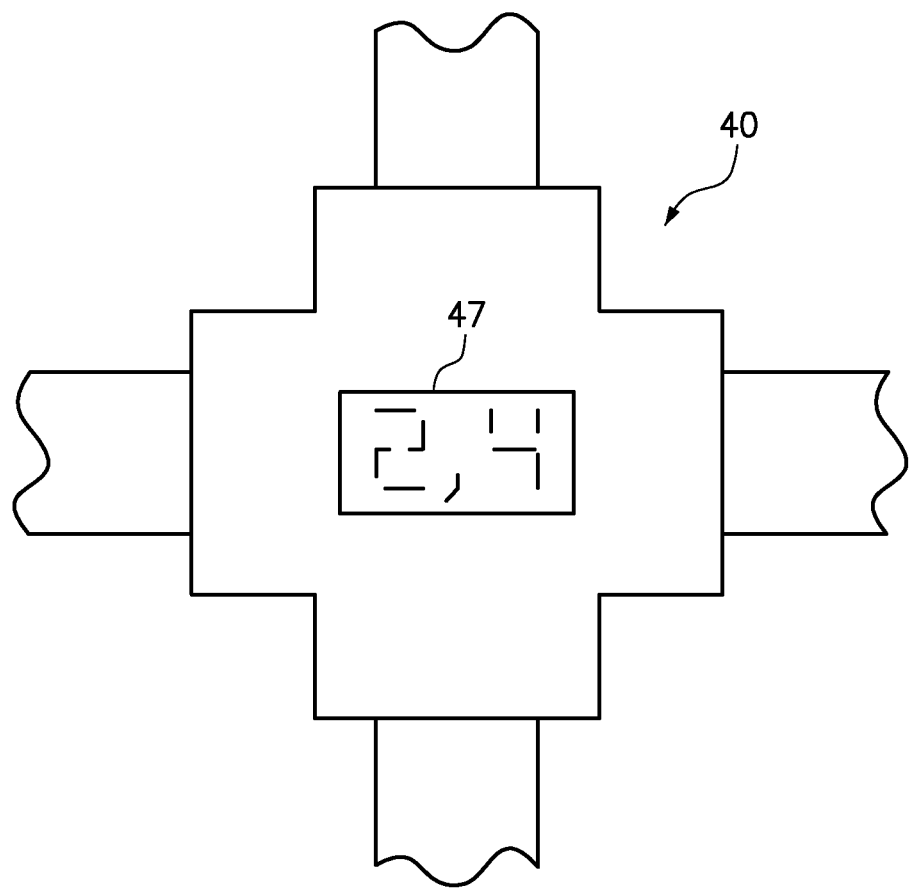
FIG. 3 is a plan view of a single hub including a display.

FIG. 3 is a plan view of a single hub 40 including an optional display 47. The small display, such as an LCD or 7-segment LED, is used to display the address assigned to the hub. Optionally, one or more of the hubs, or even each of the hubs, may include such a display. If the lattice is hung from a ceiling, then the displays should face downwardly or to one side for viewing by a system administrator. Accordingly, if the central management server 24 (See FIG. 1) generates a message to a system administrator indicating that a system at a particular address in the lattice needs service, then the system administrator can view the displayed addresses while walking through the data center in order to locate the particular system needing service.

Figure 4:
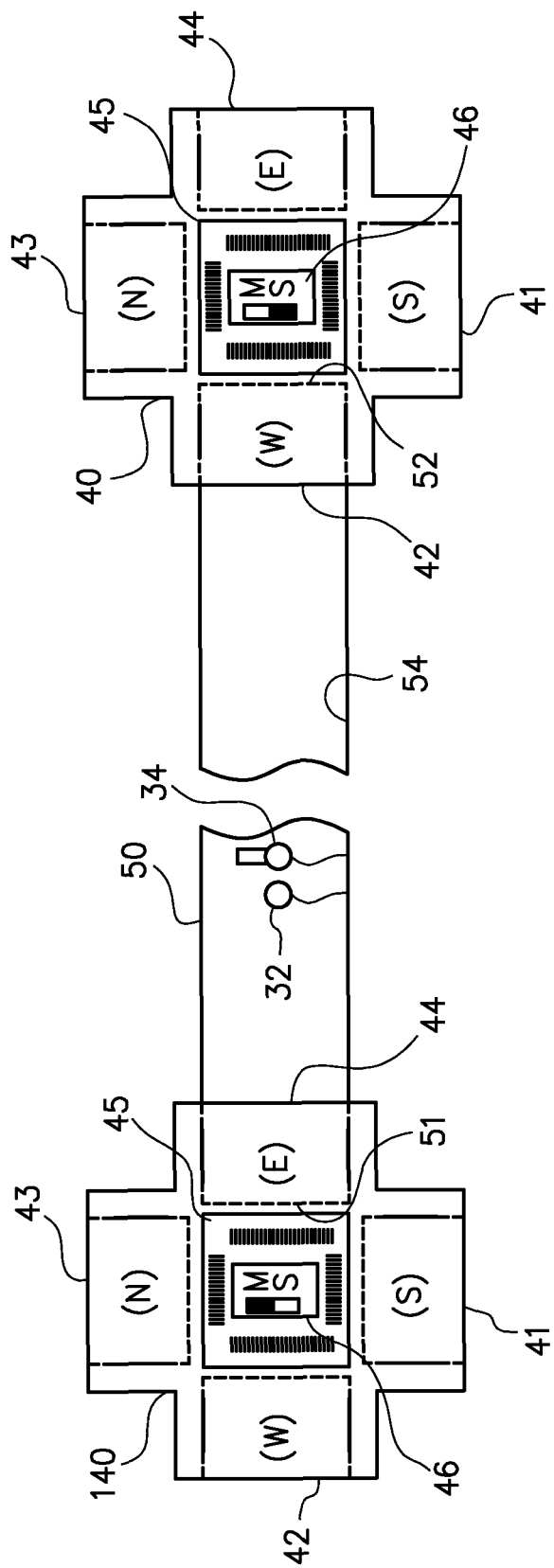
FIG. 4 is a schematic diagram further detailing a master hub, an adjacent slave hub, and a rod to be coupled between the master hub and slave hub.

FIG. 4 is a schematic diagram further detailing a master hub 140, an adjacent slave hub 40, and a rod 50 to be coupled from the port 44 of the master hub 140 to the port 42 of the slave hub 40. The master hub 140 and slave hub 40 each have four ports 41-44 and a hub controller 45 in electronic communication with each of its ports 41-44. The hub controller 45 may be or include a microchip or other circuit, and may be controlled in part by software or firmware. The hub controller 45 includes a switch or jumper schematically indicated at 46 designating this particular hub as being the master hub 140. By way of example, the switch 46 has a selectable master/slave setting, wherein setting the switch 46 to "master" designates the hub as being the master hub 140 having an address of (0,0). In a working embodiment, such a switch 46 may be electrically or mechanically implemented, or controlled by a software setting. The slave hub 40 and other slave hubs in the system may have their switches 46 set to "slave," so that those other hubs 40 do not have a predefined address. The ports 41-44 of the master hub 140 also have a predefined orientation.

Port designations may be provided for establishing the directions of rods connected to the ports. For example, the predefined port orientation of the master hub 140 in FIG. 4 are designated by compass directions "N" for North, "S" for South, "E" for East, and "W" for West. The port orientations of the slave hub 40 may be predefined at the time of manufacture, or may be established with reference to another hub according to the manner in which the rods and hubs are connected. In FIG. 4, the slave hub 40 may derive its address and the orientation (N, S, E, W) of its ports 41-44 relative to those of the master hub 140. For example, a message communicated along the rod 50 from port 44 of the master hub 140 to the port 42 of the slave hub 40, may inform the slave hub 40 that the message was sent from the East port. From this information, the slave hub 40 may determine that its port 42 is the West port, and may further determine the orientations (South, North, and East) of the remaining three ports 41, 43, 44.

The rod 50 includes a first end 51, an opposing second end 52, and a bus 54 extending from the first end 51 to the opposing second end 52. All of the ports 41-44 of the master hub 140 and slave hub 40 in this embodiment are the same size and form factor, so that either end 51, 52 of the rod 50 may be physically, releasably coupled (e.g. by friction fit) to any one of the ports 41-44 of the master hub 140 or the slave hub. In this example, the first end 51 of the rod 50 shown as being connected to the "E" port 44 of the master hub 140. The second end 52 of the rod 50 is shown being connected to the port 42 of the slave hub 40, whose address and orientation is to be subsequently determined with respect to that of the master hub 140.

The port 44 of the master hub 140 is electrically coupled to the bus 54 in response to insertion of the first end 51 of the rod 50. Likewise, the port 42 of the slave hub 40 is electrically coupled to the bus 54 in response to insertion of the second end 52 of the rod 50. The bus 54 provides a plurality of electrical conductor lines for communicating data and power between the ends 51, 52. The bus 54 may communicate messages generated by the master hub 140 to the slave hub 40 (and messages generated by the slave hub 40 to the master hub 140) along the bus 54. A message sent from the master hub 140 to the slave hub 40 may contain, for example, the address of the master hub 140 and the direction (East) that the message is being sent, as described above in reference to FIG. 2. The slave hub 40 optionally sends a confirmation message back to the master hub 40 that it has determined its address.

The master hub 140 and slave hub 40 in the FIG. 4 embodiment are structurally identical, except that the switch 46 is set to designate each hub as either the master or a slave. In another embodiment, the master and slave hubs may have distinct differences distinguishing the master and slave hubs. For example, each hub may be manufactured with an immutable designation as being either the master hub or a slave hub. In a kit embodiment, a kit may include only one master hub and a plurality of slave hubs, to ensure that conflicting messages are not generated as a result of inadvertently designating more than one hub in a lattice as the master hub.

In another embodiment, a reference point within the lattice may be explicitly established, other than through the use of a dedicated origin hub. For example, after a lattice is constructed, one or more of the hubs may be programmed with specific address information with respect to which the addresses of the other hubs may be determined. Hubs or other components serving as reference points may also include a persistent memory feature, whereby a hub will remember its address even if the reference hub used to calculate its address is removed or disabled.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A system for locating a component in a data center, comprising:
    a plurality of hubs and a plurality of rods, each rod having opposing ends and a bus extending between the opposing ends, each hub having a plurality of ports, each port for coupling to an end of one of the rods in communication with the bus to form a customizable lattice of interlocking rods and hubs, wherein each hub in the lattice is in communication with one or more other hubs in the lattice over the bus;
    a hub controller on each hub configured for computing its address according to the address of another hub in the lattice, wherein each communication comprises a hub controller on a source hub sending the address of the source hub to a selected port on the source hub along with the directional orientation of the selected port, and wherein each communication further comprises a hub controller on a destination hub receiving the address of the source hub and the directional information of the selected port on the source hub to determine the address of the destination hub; and
    a plurality of wireless transmitters distributed along the lattice, each wireless transmitter in electronic communication with one or more of the hub controllers, and each wireless transmitter configured for wirelessly transmitting location information determined relative to the addresses of the hubs.

2. The system of claim 1, further comprising:
    a wireless receiver on each of a plurality of racks positioned at different locations about a computer room, each wireless receiver configured for receiving the location information from the wireless transmitters and communicating the location information to one or more rack-mounted components of the respective rack.

3. The system of claim 1, wherein the rods have a predefined rod length, and wherein the hub controller on the destination hub computes the spacing between the source hub and destination hub as a function of the predefined rod length of the rod connecting the source hub and destination hub.

4. The system of claim 3, wherein each rod includes a key identifying the length of the rod, and wherein the hub controller is configured to read the key and determine the predefined rod length according to the key.

5. The system of claim 1, further comprising:
    a master hub designated as the origin of a coordinate system, wherein the address of each other hub in the lattice is computed with respect to the origin.

6. The system of claim 5, wherein any one of the hubs of the lattice is assignable as the master hub.

7. The system of claim 6, wherein each hub comprises a jumper or a switch for optionally designating the hub as the master hub.

8. The system of claim 6, wherein the master hub is pre-programmed as being the master hub.

9. The system of claim 1, wherein each hub comprises four ports spaced apart at about ninety degrees such that the lattice is substantially rectangular.

10. The system of claim 1, wherein the wireless transmitters are optical transmitters and the wireless receivers are optical receivers.

11. A system for locating a component in a data center, comprising:
a plurality of hubs and a plurality of rods, each rod having opposing ends and a bus extending between the opposing ends, each hub having a plurality of ports, each port for coupling to an end of one of the rods in communication with the bus to form a customizable lattice of interlocking rods and hubs, wherein each hub in the lattice is in communication with one or more other hubs in the lattice over the bus;
a hub controller on each hub configured for computing its address according to the address of another hub in the lattice;
a plurality of wireless transmitters distributed along the lattice, each wireless transmitter in electronic communication with one or more of the hub controllers, and each wireless transmitter configured for wirelessly transmitting location information determined relative to the addresses of the hubs; and
a plurality of temperature sensors distributed along the lattice configured for sensing temperatures at different locations in the lattice and generating signals representative of the sensed temperatures.

12. The system of claim 11, wherein the temperature sensors are in communication with the wireless transmitters, and the wireless transmitters are further configured for wirelessly transmitting the sensed temperatures and the locations of the sensed temperatures.

13. A method, comprising:
interconnecting a plurality of hubs and rods to form a lattice by coupling a first end of each rod with a port of one hub and coupling an opposing second end of each rod with the port of another hub;
uniquely designating one of the hubs as the origin hub and uniquely identifying each port of the origin hub;
generating a separate message at each port of the origin hub indicating the address of the origin hub and the identity of the port at which the message is generated;
communicating the message at each port of the origin hub to the port of an adjacent hub over a respective rod connecting the port of the origin hub to the port of the adjacent hub;
determining the address of each adjacent hub according from the message communicated from the origin hub; and
wirelessly transmitting location information from a plurality of different locations within the lattice through open space, wherein the location information is determined relative to the address of one or more of the hubs.

14. The method of claim 13, further comprising:
receiving the transmitted location information at different locations about a computer room; and
determining the locations of the computer components at the different locations about the computer room dependent on the optically transmitted location information.

15. The method of claim 13, comprising:
uniquely associating a direction with each port on a source hub in the lattice;
sending a message from a port of the source hub to a port of a destination hub in the lattice over a rod connecting the port of the source hub to the port of the destination hub, the message including the address of the source hub and the direction associated with the port of the source hub;
communicating the message from the port of the source hub to the port of the destination hub over the rod connecting the source hub to the destination hub; and
computing the address of the destination hub based upon the address of the source hub, the length of the rod coupling the source hub to the destination hub, and the direction associated with the port of the source hub.

16. The method of claim 13, further comprising:
optically transmitting the location information from the lattice through open space; and
optically receiving and decoding the location information.

17. The method of claim 13, further comprising:
determining the address of each hub using a reference coordinate system of the lattice obtained with respect to the origin hub.

18. The method of claim 13, wherein the rods have predefined lengths.

19. The method of claim 13, further comprising:
keying each rod according to its length.

* * * * *